United States Patent [19]

Bojas

[11] Patent Number: 5,433,304
[45] Date of Patent: Jul. 18, 1995

[54] VISCOUS COUPLING BY-PASS ELEMENT HAVING VARIABLE DRIVE CAPABILITY

[75] Inventor: Edward J. Bojas, Marshall, Mich.

[73] Assignee: Eaton Corporation, Cleveland, Ohio

[21] Appl. No.: 81,758

[22] Filed: Jun. 23, 1993

[51] Int. Cl.[6] .................. F16H 45/02; F16D 35/00; F16D 47/06
[52] U.S. Cl. .................. 192/3.28; 192/3.29; 192/3.33; 192/58 B
[58] Field of Search ............... 192/3.28, 3.29, 3.32, 192/3.33, 48.3, 58 B, 106.2

[56]     References Cited
U.S. PATENT DOCUMENTS

| | | | |
|---|---|---|---|
| 2,931,472 | 4/1960 | Ahlen | 192/3.29 X |
| 4,317,510 | 3/1982 | Staub, Jr. | 192/3.29 X |
| 4,423,803 | 1/1984 | Malloy | 193/3.29 |
| 4,441,595 | 4/1984 | Lamarche | 192/3.29 |
| 4,462,492 | 7/1984 | Mueller | 192/3.29 |
| 4,466,518 | 8/1984 | Mueller | 192/3.29 |
| 4,496,034 | 1/1985 | Bopp | 192/3.28 |
| 4,505,365 | 3/1985 | Bopp | 192/3.29 |
| 4,643,283 | 2/1987 | Wonn | 192/3.33 |
| 4,892,178 | 1/1990 | Damon et al. | 192/106.2 |
| 4,899,859 | 2/1990 | Teraoka | 192/58 B X |
| 4,997,071 | 3/1991 | Villata et al. | 192/57 |
| 5,086,893 | 2/1992 | Bojas | 192/3.29 |
| 5,125,486 | 6/1992 | Murata | 192/3.26 |
| 5,172,796 | 12/1992 | Campbell et al. | 192/3.29 |

Primary Examiner—Andrea L. Pitts
Attorney, Agent, or Firm—L. J. Kasper

[57]     ABSTRACT

A viscous coupling (29) is disclosed for use as a by-pass element in a torque converter (15). The viscous coupling (29) includes a body member (31) and a cover member (33), with an annular clutch member (35) being disposed in a viscous shear area defined by the body and the cover. When the coupling is filled with viscous fluid, it has a nominal drive factor. The body member (31) defines a fill-hole (63) and an evacuation (discharge) passage (65). A pump element (71) is disposed adjacent the evacuation passage. A valve member (79) moves in response to changes in fluid pressure in an apply chamber (A), and in a low-gain mode, permits flow through the evacuation passage (65) filling the shear space radially outward of the pump element (71). In a high-gain mode, the valve member (79) blocks flow through the evacuation passage (65), and the entire shear area is filled.

17 Claims, 4 Drawing Sheets

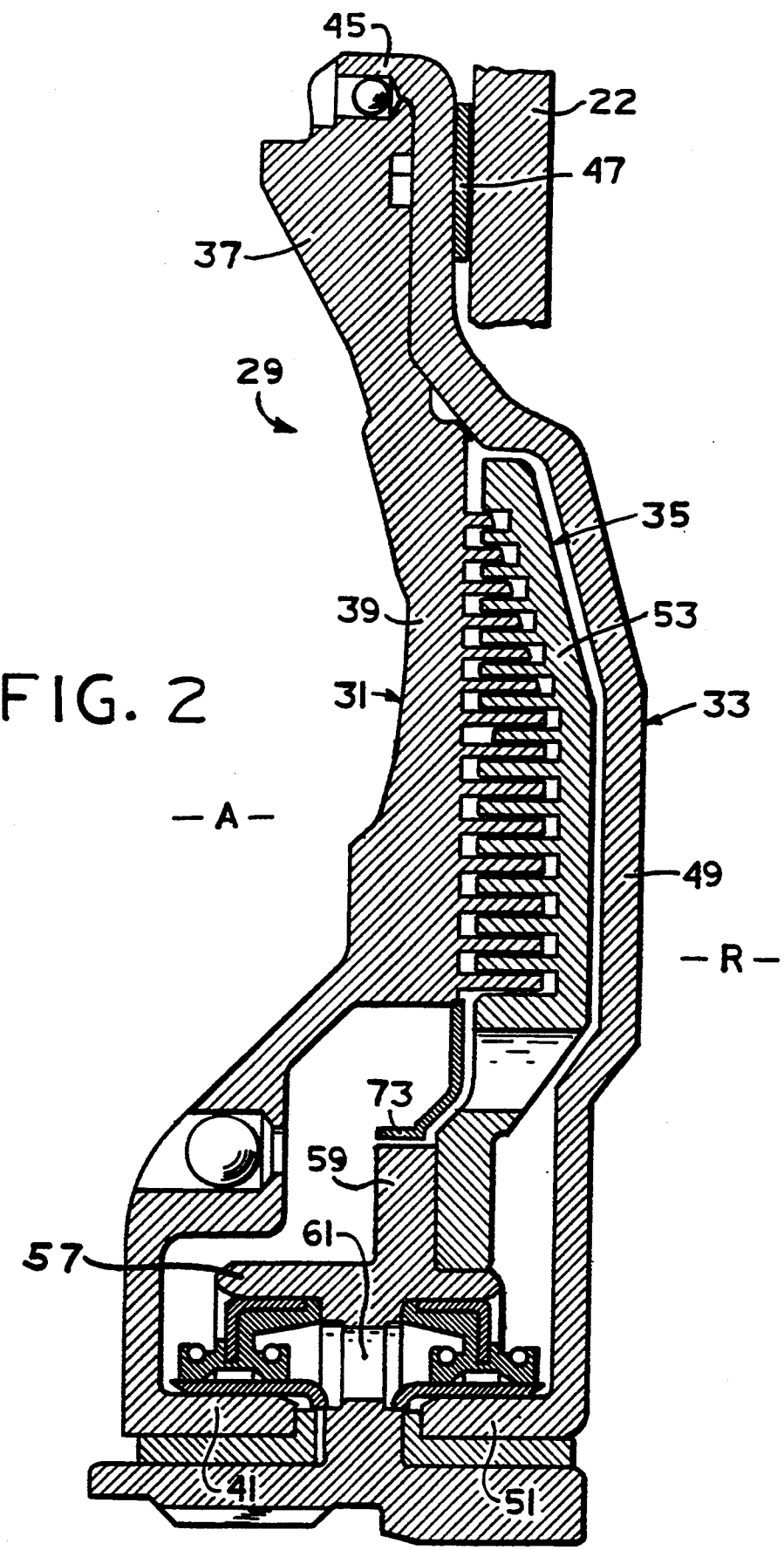

VISCOUS COUPLING BY-PASS ELEMENT HAVING VARIABLE DRIVE CAPABILITY

BACKGROUND OF THE DISCLOSURE

The present invention relates to viscous couplings, and more particularly, to such couplings of the type which are now employed in automatic transmission torque converters, to serve as by-pass elements, by-passing the torque converter.

Torque converter type automatic transmissions have achieved widespread application and acceptance in motor vehicles. Although generally satisfactory in this application, torque converter type automatic transmissions inherently involve a certain amount of slippage, and therefore, inherently result in losses in vehicle fuel economy. In an effort to minimize such slippage, and thereby increase fuel economy, efforts have been made to by-pass the torque converter with some type of relatively direct drive, which typically is activated when the vehicle is operating in the higher gear ratios, and above a predetermine vehicle speed. Although the term "by-pass" is used in regard to this type of element, those skilled in the art will understand that the element is actually transmitting torque in parallel with the torque converter.

While such prior art direct drive by-pass arrangements have resulted in improvements in fuel economy, certain types of by-pass elements utilized have, under certain operating conditions, transmitted various driveline vibrations to the passenger compartment of the vehicles, causing degradation of the ride quality of the vehicle.

In an effort to provide a by-pass element which would not transmit driveline vibration to the passenger compartment, those skilled in the art have utilized a viscous coupling as the by-pass element. Although the use of a viscous coupling as the by-pass element does serve to minimize the transmission of driveline vibration, it is still important that the coupling be designed for maximum durability and, at the same time, be reliable and inexpensive to manufacture.

A typical prior art viscous coupling of the type to which the present invention relates is illustrated and described in U.S. Pat. No. 5,044,477, assigned to the assignee of the present invention, and incorporated herein by reference. Such couplings typically include a cast aluminum body or sidewall member, and a cast aluminum clutch member. Each of these cast aluminum members is then machined to define a plurality of annular, concentric lands and grooves, arranged so that the lands and grooves of the body and clutch are interdigitated, upon assembly thereof, to define a serpentine-shaped viscous shear space. During operation, the shear space is filled with viscous fluid, which is typically a silicone fluid, such that rotation of the body member transmits torque to the clutch member by means of viscous shear drag, as is now well known to those skilled in the viscous coupling art.

In designing and applying such viscous couplings, for use as torque converter by-pass elements in a typical vehicle application, there are usually two competing design considerations. On the one hand, it is desirable to minimize the amount of slip (i.e., the difference between the input speed and the output speed) so that, during operation at normal driving speeds, the overall fuel efficiency of the vehicle is as high as possible. On the other hand, the amount of slip and the dampening by the viscous coupling must be sufficient to minimize the amount of vibration transmitted by the clutch, and provide the desired ride characteristics.

One of the primary design characteristics of such a viscous coupling is the "drive factor", which is typically defined as the effective surface area under shear. The drive factor of a viscous coupling is a function of the surface area that is being sheared, the clearance between adjacent sheared surfaces, the radius at which the sheared surfaces act, and the fluid viscosity of the active fluid volume within the shear chamber.

SUMMARY OF THE INVENTION

Accordingly, it is an object of the present invention to provide an improved viscous coupling for use as a by-pass element for a torque converter, wherein it is possible to vary the effective drive factor as operating conditions vary.

It is a more specific object of the present invention to provide such an improved viscous coupling in which, at lower vehicle speeds, the drive factor is reduced to minimize the amount of vibration transmitted, while at relatively higher vehicle speeds, the drive factor is increased, resulting in higher levels of transferred torque, to optimize the fuel efficiency of the vehicle.

The above and other objects of the invention are accomplished by the provision of an improved viscous coupling for use as a by-pass element for a torque converter including a torque converter housing and an output shaft. The viscous coupling is of the type including an annular housing assembly adapted to be positioned within the torque converter housing and having a body member and a cover member cooperating to define an annular viscous chamber therebetween, adapted to contain viscous fluid. The annular housing assembly defines a clutch surface adapted for clutching co-action with a confronting surface of the torque converter housing. An annular clutch member is disposed within the viscous chamber, the body member and the clutch member cooperating to define a viscous shear chamber and a reservoir. The clutch member is adapted to be drivingly associated with the output shaft of the torque converter. The viscous coupling is configured, when the viscous shear chamber is filled with viscous fluid, to have a drive factor substantially equal to a predetermined, nominal drive factor.

The improved viscous coupling is characterized by means operable to vary the drive factor of the viscous coupling from the predetermined, nominal drive factor, in response to changes in a predetermined operating condition.

BRIEF DESCRIPTION OF THE DRAWINGS

FIG. 2 is an axial cross-section illustrating the upper half of a viscous coupling by-pass element of the type with which the present invention may be utilized.

DESCRIPTION OF THE PREFERRED EMBODIMENTS

Figure 1:
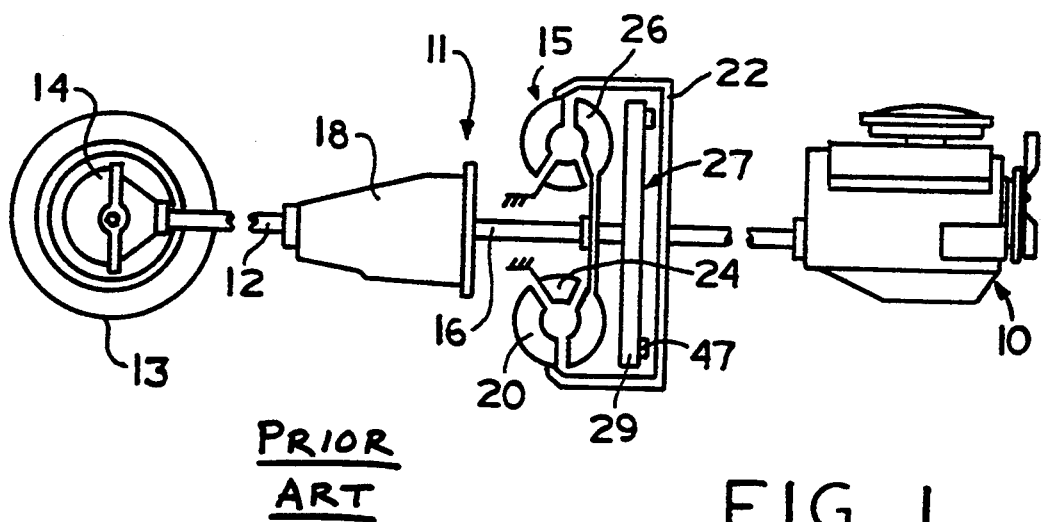
FIG. 1 is a schematic view of a motor vehicle drive train including a torque converter type automatic transmission employing a torque converter by-pass element comprising a viscous coupling of the type to which the present invention relates.

Referring now to the drawings, which are not intended to limit the invention, FIG. 1 shows schematically a motor vehicle drive train, including an internal combustion engine 1 0, an automatic transmission 11, and a propeller shaft 12 driving wheels (front or rear) 13 through a differential 14. The automatic transmission 11 includes a torque converter 15 having an output shaft 16 and a gear ratio box 18, the box 18 being driven by the torque converter output shaft 16. The torque converter 15 is filled with automatic transmission fluid ("ATF") and includes, in a manner well known in the art, a pump element 20 driven by the engine 10 through a torque converter housing 22 (shown also in FIG. 2). The torque converter 15 also includes a stator 24, and a turbine 26 which is driven hydrokinetically by the pump 20. The torque converter 15 further includes a bypass element, generally designated 27, the by-pass element 27 being effective, when actuated, to provide a direct drive from the torque converter housing 22 to the torque converter output shaft 16, through a viscous coupling 29, thus transmitting torque to the output shaft 16, in parallel with (by-passing) the high slippage drive path through the pump 20 and turbine 26. The details of the positioning of the viscous coupling 29 within the torque converter 15 are illustrated and described further in above-incorporated U.S. Pat. No. 5,044,477.

Referring now primarily to FIG. 2, the viscous coupling 29 of the present invention will be described in some detail, although even greater detail can be seen in the above-incorporated U.S. Pat. No. 5,044,477. The viscous coupling 22 of the type to which the present invention relates is generally annular, and generally "planar", and is of a "sandwich" construction. The viscous coupling 29 includes an annular housing assembly, having axially-spaced annular sidewall members defining an annular clutch chamber therebetween with an annular clutch assembly being disposed within the clutch chamber. One sidewall of the annular housing is constituted by a body member, generally designated 31, and the other sidewall of the annular housing is constituted by a cover member 33. The body member 31 and cover member 33 cooperate to define an annular viscous clutch chamber therein. A clutch assembly, generally designated 35, is disposed within the clutch chamber. The cover member 33 is preferably formed as an aluminum stamping, while the body member 31 and the elements of the clutch assembly 35 are preferably formed as permanent mold aluminum castings.

The body member 31 includes a radially outer peripheral portion 37, an intermediate sidewall portion 39, and an inner portion terminating in an axially-extending hub portion 41. Intermediate sidewall portion 39 is typically machined on its inner face to form a series of annular lands 43 (see FIG. 3), which define therebetween a series of annular grooves.

The cover member 33 includes a radially outer peripheral portion 45, which may be rolled over the peripheral portion 37 of the body member 31, or attached thereto by any other suitable means. An annular clutch lining 47 is adhesively secured to a forward surface of the cover member 33 for clutching co-action with a confronting, inner surface of the torque converter housing 22. The cover member 33 further includes a intermediate wall portion 49, and a radially inner portion terminating in an axially-extending hub portion 51.

The clutch assembly 35 includes a clutch member 53 which is machined to form a series of annular lands 55 (see FIG. 5), which define therebetween a series of annular grooves. The annular lands 43 of the body member, and the annular lands 55 of the clutch member are interdigitated to define therebetween a serpentine-shaped viscous shear space, adapted to transmit torque from the body member 31 to the clutch assembly 35, in response to the presence of viscous fluid in the shear space. Subsequently, references to the shear space will be accompanied by the reference numerals 43 and 55, which are the lands which cooperate to define the shear space.

The clutch assembly 35 further includes an annular, axially-extending hub portion 57, including a radially-extending mounting portion 59, which is secured by a plurality of rivets (not shown herein) to the clutch member 53. The mounting portion 59 defines a plurality of axially-extending fluid openings 61, the function of which is to permit the circulation of viscous fluid within the coupling, between the shear space and the area between the clutch member 53 and the cover member 33. Various additional construction details relating to the hub portion 57, which form no part of the present invention, may be seen by reference to above-incorporated U.S. Pat. No. 5,044,477.

Figure 3:
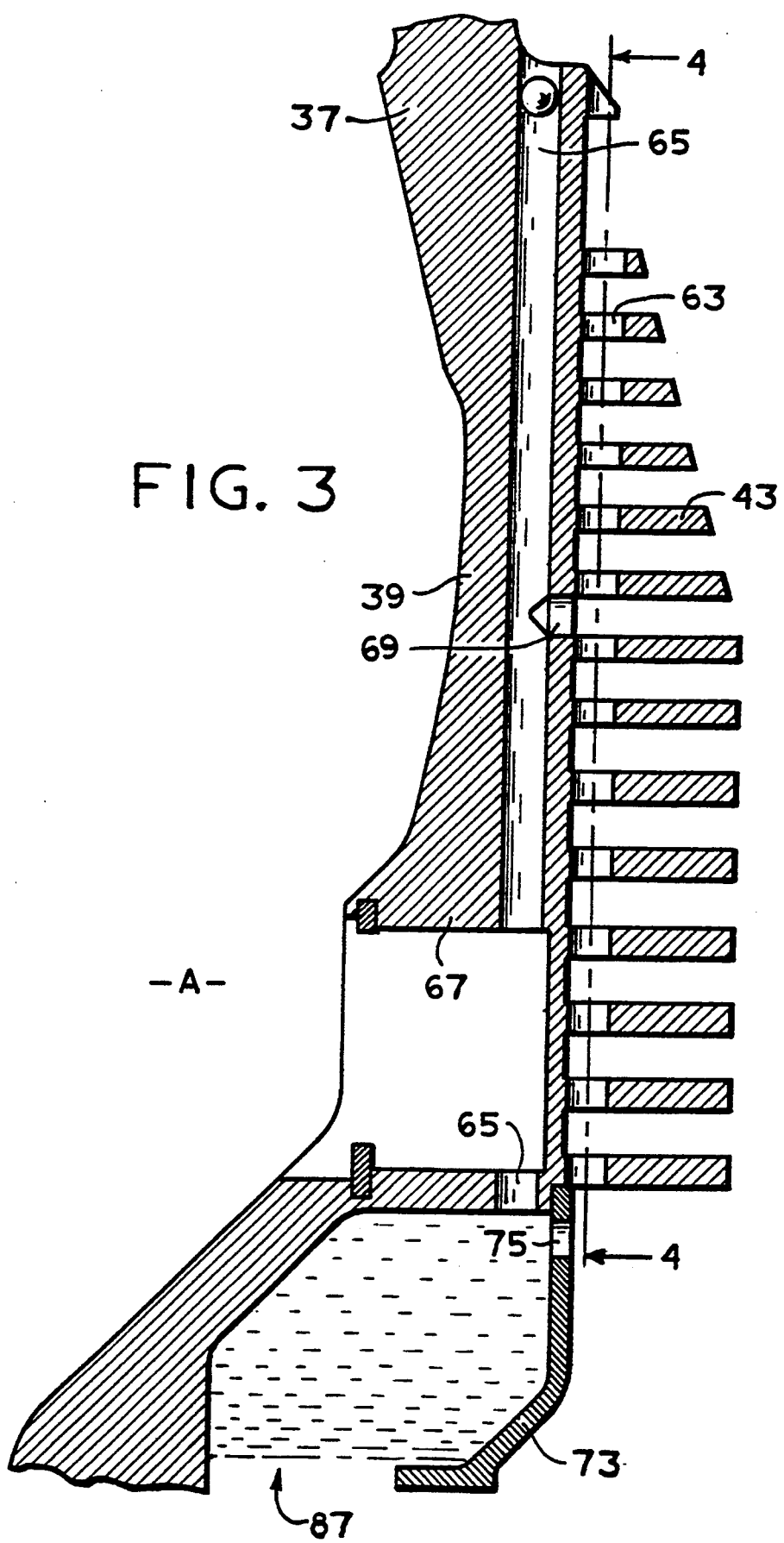
FIG. 3 is an enlarged, fragmentary, axial cross-section, similar to FIG. 2, but taken on a different plane, and including only the body member.

It should be noted that all structure described thus far is conventional, is generally well known to those skilled in the art, and has been in extensive commercial use by the assignee of the present invention. Referring now primarily to FIG. 3, which is taken on a different plane than FIG. 2, various structural aspects of the present invention will be described. As is well known to those skilled in the art, viscous couplings of the type to which the present invention relates have not typically included any sort of a "fluid reservoir" because, during any sort of operation of the coupling (i.e., whenever the engine is running), substantially the entire viscous shear area would be filled with fluid, and conversely, substantially all of the fluid in the coupling would be disposed within the viscous shear area. The significance of this characteristic of prior art couplings will become apparent subsequently.

Figure 4:
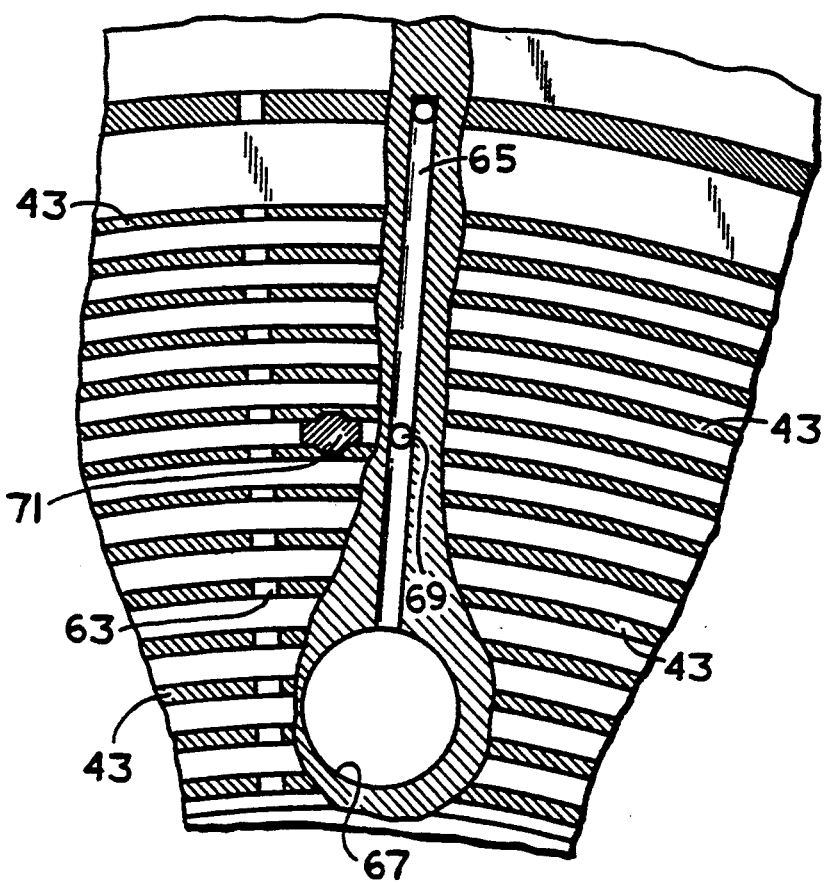
FIG. 4 is a transverse cross-section, taken on line 4—4 of FIG. 3, but on a smaller scale than FIG. 3, and partly broken-away.

Referring now primarily to FIGS. 3 and 4, the sidewall portion 39 defines a fast fill hole 63 which, in the subject embodiment, is actually defined by drilling a radial hole through each of the annular lands 43, immediately adjacent the sidewall portion 39. The fill hole 63 is located as shown in FIGS. 3 and 4 so that, as viscous fluid flow radially outwardly through the hole 63, it has immediate and direct access to the viscous shear area defined by the interdigitated lands 43 and 55.

The sidewall portion 39 further defines a radially oriented evacuation (discharge) passage 65 which, unlike the fill hole 63, is actually a single, continuous passage defined entirely by, and surrounded by the sidewall portion 39. As may best be seen in FIG. 4, the evacuation passage 65 intersects a large, axially-oriented cylindrical opening 67, the function of which will be described subsequently.

Referring still to FIGS. 3 and 4, the sidewall portion 39 defines an axially-extending pump passage 69, extending from the "bottom" of a groove between adjacent lands 43, into the evacuation passage 65. Disposed circumferentially adjacent the pump passage 69 is a wiper element 71, which is preferably pressed into an opening drilled in the sidewall portion 39. Those skilled in the art will understand by comparing FIGS. 3 and 4, that although both the fill hole 63 and the evacuation passage 65 are shown in FIG. 3, they are actually circumferentially displaced, relative to each other, as shown in FIG. 4, and the axial cross-section of FIG. 3 in reality includes two different sections.

Figure 5:
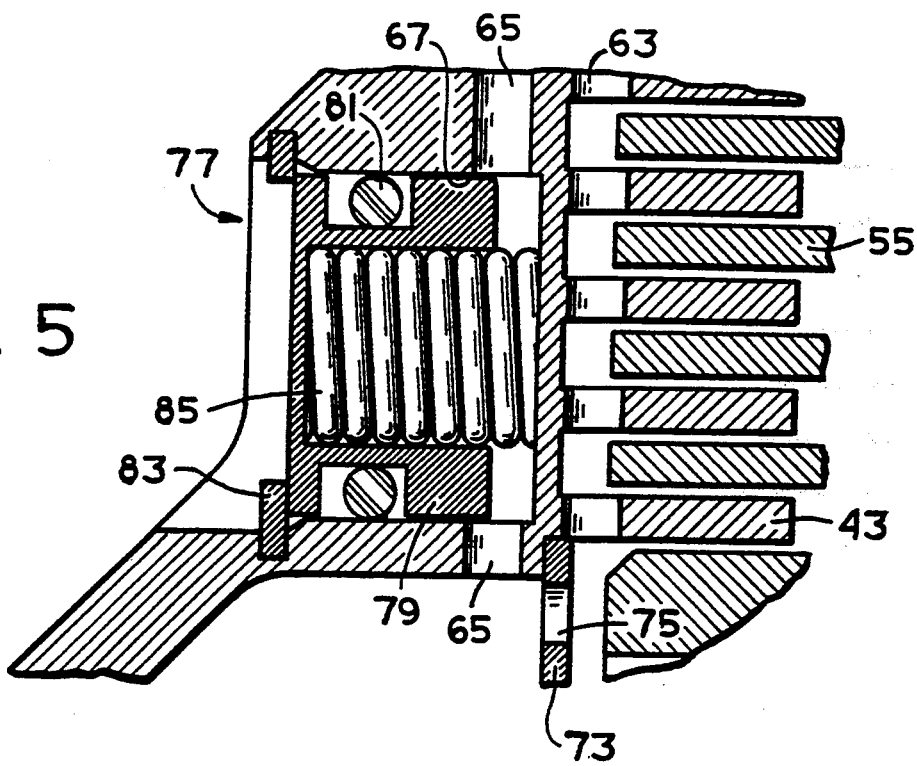
FIG. 5 is a further enlarged, fragmentary, axial cross-section, illustrating the valving arrangement of the present invention.

Referring now primarily to FIGS. 3 and 5, in conjunction with FIG. 2, there is a reservoir ring 73 snapped in place adjacent the annular, inside diameter defined by the sidewall portion 39. Preferably, the reservoir ring 73 may comprise a stamped, steel member, and defines at least one bleed hole 75, positioned to permit fluid communication from the left side of the ring 73 to the right side thereof. The specific function of the reservoir ring 73 and bleed hole 75 will be described subsequently, in connection with the description of the operation.

Referring now primarily to FIG. 5, disposed within the cylindrical opening 67 is a pressure-responsive valve assembly, generally designated 77. The valve assembly 77 comprises a hollow, generally cylindrical valve member 79, which is slidably disposed within the opening 67. Disposed around the valve member 79 is an O-ring member 81, the function of which is to separate the ATF in an adjacent apply chamber A (see FIGS. 2 and 3), from the viscous fluid contained within the viscous coupling 29. Disposed adjacent the left end of the valve member 79 is a snap-ring 83. Disposed within the hollow central opening defined by the valve member 79 is a coiled compression spring member 85 which, in the absence of substantial pressure in the apply chamber A, biases the valve member 79 to the position shown in FIG. 5, seated against the snap-ring 83. It should be noted that with the valve member in the position shown in FIG. 5, the right end of the valve member 79 leaves a major portion of the evacuation passage 65 uncovered, such that fluid can readily flow radially inwardly through the evacuation passage 65, through the opening 67 (around the spring 85), then through the radially innermost part of the passage 65, and into a reservoir region 87 (see FIG. 3), bounded by the sidewall portion 39 on the left, and the reservoir ring 73 on the right.

Operation

Figure 6:
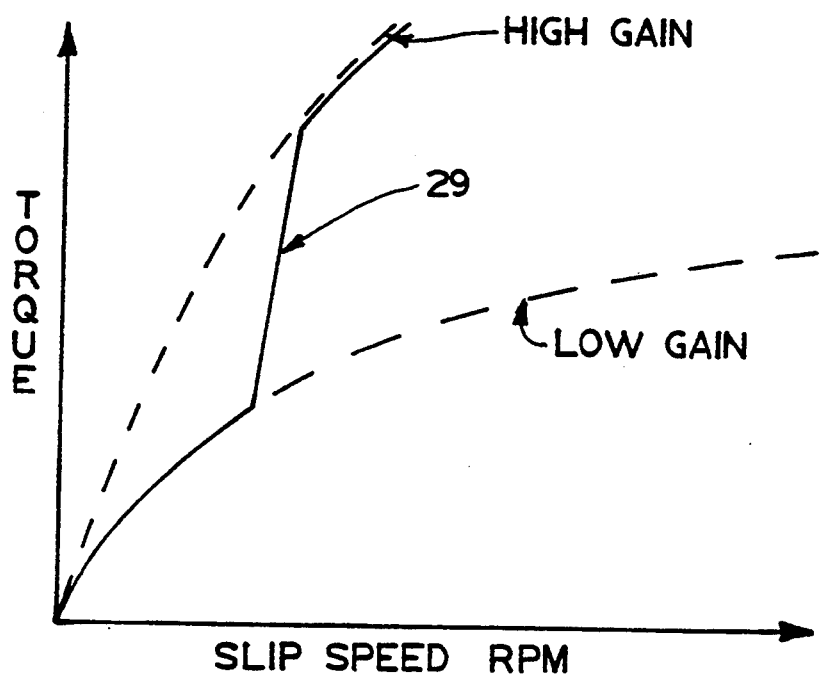
FIG. 6 is a graph of torque versus slip speed, illustrating the present invention.

Referring now primarily to FIGS. 4, 5, and 6, the operation of the viscous coupling 29 will be described in its two primary operating modes, i.e., a low-gain mode, and a high-gain mode. It should, however, be understood by those skilled in the art that operation in the modes to be described subsequently does not necessarily imply that the viscous coupling 29 of the present invention is operable in just two separate discrete modes, in the manner of an "ON-OFF" switch, and that there is the opportunity for operation of the invention varying gradually from the low gain mode to the high gain mode.

In the low gain mode, which, by way of example only would typically occur with pressure of the ATF in the apply chamber A somewhere below about 60 PSI, the apply pressure would be insufficient to overcome the biasing force of the spring 85. Thus, in the low gain mode, the valve member 79 remains biased to its extreme, "OPEN" position, as shown in FIG. 5, With the valve member 79 in the "OPEN" position, and the body member 31 rotating clockwise in FIG. 4, relative to the clutch member 53, there is a localized region of pressure build-up adjacent the right side (in FIG. 4) of the wiper member 71. As a result, fluid is able to flow radially outwardly through the fast-fill hole 63, and fills substantially the entire shear area 43,55 radially outward of the pump passage 69 and wiper element 71. However, because the valve member 79 is open, pressure build-up adjacent the wiper 71 results in fluid being pumped out through the pump passage 69, into the evacuation passage 65, and from there the fluid flows into the reservoir region 87, in the manner described previously. As a result of this pumping out of fluid from the shear area, the lands and grooves disposed radially inwardly from the pump passage 69 and wiper element 71 do not become "wetted" with viscous fluid, and these inner lands and grooves are not effective to transmit torque. Referring again to FIG. 3, it may be seen that in the low gain mode, the reservoir region 87 is sized to contain approximately the amount of fluid which would be contained in all of the inner lands and grooves, if the entire shear area were full of fluid. At the same time that fluid is entering the reservoir region 87 from the evacuation passage 65, fluid is also flowing out of the reservoir region 87 through the bleed hole 75. The rate of flow through the bleed hole 75 is, preferably, just about the same as the rate of pump-out through the pump passage 69, such that a "balance" is maintained.

As may be seen in FIG. 6, at lower slip speeds, the viscous coupling 29 operates on a curve (labeled "29"), which follows a "LOW GAIN" curve up until a predetermined slip speed.

Referring again primarily to FIG. 5, operation in the high gain mode will now be described. As the pressure of the ATF in the apply chamber A increases, typically somewhat above 60 psi, the valve member 79 begins to move to the right, as the pressure in the apply chamber A overcomes the biasing force of the spring 85. As the valve member 79 moves further to the right, it begins to restrict the flow area through the evacuation passage 65. As the right end of the valve member 79 reaches the "bottom" (right end in FIG. 5) of the opening 67, flow through the evacuation passage 65 is completely blocked. During the rightward movement of the valve member 79, as described above, the coupling 29 undergoes a transition from the low gain mode to the high gain mode (see generally vertical portion of graph "29" in FIG. 6).

With the valve member 79 in the "CLOSED" position, there is no pump-out of fluid through the pump passage 69, caused by the wiper element 71, although there will still be the usual build-up of pressure adjacent the element 71. Without any pump-out of fluid through the pump passage 69, all of the fluid which was in the reservoir region 87 flows through the bleed hole 75, then flows radially outwardly through the fast-fill hole 63, filling all of the inner lands and grooves which comprise the "inner" shear area. As is well known to those skilled in the art, the filling of the inner lands and grooves will occur progressively, starting with the lands and grooves immediately radially inward from the pump passage 69 and wiper element 71, then progressing radially inwardly therefrom. It is during the time that these inner lands and grooves are being progressively filled that the transition from the low gain mode to the high gain mode shown in FIG. 6 occurs.

When all of the inner lands and grooves are filled, and the reservoir region 87 is substantially empty, then the viscous coupling 29 of the present invention reaches the "HIGH GAIN" curve shown in FIG. 6, and thereafter (i.e., with increasing slip speed), operates in the high gain mode.

It may be seen from the foregoing description that the present invention provides a viscous coupling 29 which is operable in a low gain mode (preferably at relatively lower slip speeds) in response to a relatively lower apply pressure, thus providing more damping, and transmitting less vibration at lower vehicle speeds. Furthermore, the present invention provides a viscous coupling which is then operable to move toward, and then operate in, a high gain mode (preferably at relatively higher slip speeds) in response to increasing apply pressure, to transmit greater torque and improve vehicle fuel efficiency, at higher vehicle speeds.

Alternative Embodiment

Although not shown herein, it is believed that in view of the foregoing description, it would be conceptually possible for those skilled in the art to apply the variable gain teachings of the present invention to viscous coupling by-pass elements other than of the land and groove type. For example, U.S. Pat. No. 5,172,796, assigned to the assignee of the present invention and incorporated herein by reference, illustrates and describes a plate-type viscous coupling by-pass element, wherein the body and clutch preferably comprise steel stamping, rather than machined aluminum castings. Therefore, in such a coupling it is not readily possible to drill radial passages in the body or clutch, such as the fill hole 63 and evacuation passage 65 of the present invention. Instead, other means are necessary to decrease, in the low gain mode, the effective shear area of the coupling, and therefore, the overall "drive factor" of the coupling.

It is believed that it would also be conceptually possible for those skilled in the art to apply the variable gain teachings of the present invention such that the gain of the coupling would vary, not in response to differing pressures in the apply chamber A, but instead, in response to changes of speed of the coupling or speed difference between the body and clutch.

Finally, it is believed to be conceptually possible to achieve the objects of the present invention by modifying one or more of the elements of which the drive factor is a function.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A viscous coupling adapted for use as a by-pass element for a torque converter including a torque converter housing and an output shaft; said viscous coupling being of the type including an annular housing assembly adapted to be positioned within the torque converter housing and having first and second axially spaced, radially-extending, annular side wall members defining an annular viscous shear chamber therebetween, containing viscous fluid to define a wetted surface within said shear chamber, and have an effective drive factor; said annular housing assembly defining a clutch surface adapted for clutching co-action with a confronting surface of the torque converter housing, in response to the presence of pressurized fluid in an apply chamber; an annular clutch assembly disposed within said viscous shear chamber and including an annular, radially-extending clutch portion cooperating with one of said side wall members to define a viscous shear chamber and a reservoir, and a hub portion adapted to be drivingly associated with the output shaft of the torque converter; characterized by:

(a) one of said clutch portion and said one of said side wall members defining generally radially-extending fill passage means providing fluid communication from said reservoir to said viscous shear chamber;

(b) one of said first and second side wall members defining discharge passage means, including pump means, providing fluid communication from said viscous shear chamber to said reservoir; and (c) valve means operable in response to variations in the fluid pressure in said apply chamber to vary the fluid communication through one of said fill passage means and said discharge passage means, thereby varying the wetted surface of said viscous shear chamber and varying the effective drive factor of said viscous coupling.

2. A viscous coupling as claimed in claim 1, characterized by said pump means including a primary pumping element operable to pump fluid through said discharge passage means, to said reservoir, in response to rotation of said annular housing assembly, relative to said clutch portion.

3. A viscous coupling as claimed in claim 2, characterized by said first side wall member cooperating with said torque converter to define said apply chamber; and said first side wall member defining said discharge passage means.

4. A viscous coupling as claimed in claim 3, characterized by said valve means being operably associated with said discharge passage means, and including a valve member movable between a first position, substantially preventing fluid flow through said discharge passage means, and a second position permitting substantially unrestricted fluid flow through said discharge passage means.

5. A viscous coupling as claimed in claim 4, characterized by said first side wall member and said clutch portion cooperating to define said fill passage means, said fill passage means being in fluid communication with said viscous shear chamber, at a plurality of radially-disposed locations over a major portion of the radial extent of said viscous shear chamber.

6. A viscous coupling as claimed in claim 5, characterized by said primary pumping element being disposed radially intermediate the radially inner and outer extents of said viscous shear chamber, said pumping element being operable to pump fluid from said viscous shear chamber, through said discharge passage means, to said reservoir.

7. A viscous coupling as claimed in claim 6, characterized by said primary pumping element being operable, when said valve member is in said second position, to prevent fluid fill of said viscous shear chamber, radially inwardly from said primary pumping element, while permitting fluid fill of said viscous shear chamber, radially outwardly from said pumping element.

8. A viscous coupling as claimed in claim 4, characterized by said reservoir being disposed axially between said first side wall member and said clutch portion, said reservoir including means operable to limit the fluid volume of said reservoir when said valve member is in said second position.

9. A viscous coupling as claimed in claim 1, characterized by said first side wall member and said clutch portion cooperating to define a plurality of annular, interdigitated lands and grooves defining said viscous shear chamber.

10. A viscous coupling adapted for use as a by-pass element for a torque converter including a torque converter housing and an output shaft; said viscous coupling being of the type including an annular housing assembly adapted to be positioned within the torque converter housing and having a body member and a cover member cooperating to define an annular viscous shear chamber therebetween, containing viscous fluid; said annular housing assembly defining a clutch surface adapted for clutching co-action with a confronting surface of the torque converter housing; an annular clutch member disposed within said viscous shear chamber, said body member and said clutch member cooperating to define a viscous shear chamber and a reservoir, said clutch member being adapted to be drivingly associated with the output shaft of the torque converter; said viscous coupling being configured, when said viscous shear chamber is filled with viscous fluid, to have a drive factor substantially equal to a predetermined, nominal drive factor; characterized by:
 (a) means operable to vary said drive factor of said viscous coupling from said predetermined, nominal drive factor, in response to changes in a predetermined operating condition.

11. A viscous coupling as claimed in claim 10, characterized by said body member and said clutch member cooperating to define a plurality of interdigitated lands and grooves, said lands and grooves defining said viscous shear chamber.

12. A viscous coupling as claimed in claim 11, characterized by said means operable to vary said drive factor comprises means operable to reduce said drive factor of said viscous coupling, from said predetermined, nominal drive factor.

13. A viscous coupling as claimed in claim 12, characterized by said means operable to reduce said drive factor comprising valve means operable to reduce the quantity of viscous fluid in said viscous shear chamber, in response to changes in said predetermined operating condition.

14. A viscous coupling as claimed in claim 13, characterized by said body member cooperating with said torque converter to define an apply chamber, pressurized fluid in said apply chamber causing said clutching co-action of said clutch surface of said annular housing assembly with said confronting surface of the torque converter housing.

15. A viscous coupling as claimed in claim 14, characterized by the pressure of the fluid in said apply chamber comprising said predetermined operating condition.

16. A viscous coupling as claimed in claim 15, characterized by said body member defining a fill passage means providing fluid communication from said reservoir to said shear chamber, and discharge passage means including pump means providing fluid communication from said viscous shear chamber to said reservoir.

17. A viscous coupling as claimed in claim 16, characterized by said valve means being operable in response to variations in the fluid pressure in said apply chamber to vary the fluid communication through one of said fill passage means and said discharge passage means, to vary said drive factor.

* * * * *